United States Patent [19]
Viljanen

[11] Patent Number: 5,698,950
[45] Date of Patent: Dec. 16, 1997

[54] SUPPRESSOR FOR AN ELECTRONIC BALLAST IN A DISCHARGE LAMP

[75] Inventor: Teijo Viljanen, Kauniainen, Finland

[73] Assignee: OY Helvar, Finland

[21] Appl. No.: 559,772

[22] Filed: Nov. 15, 1995

[30] Foreign Application Priority Data

Nov. 22, 1994 [FI] Finland ..................... 945473

[51] Int. Cl.$^6$ ..................... H05B 41/00; H02M 3/10
[52] U.S. Cl. ..................... 315/247; 323/222; 363/44; 315/209 R; 315/224
[58] Field of Search ..................... 315/224, 209 R, 315/247; 363/44, 45, 34, 49; 323/222

[56] References Cited

U.S. PATENT DOCUMENTS 5,224,025  6/1993  Divan et al. ..................... 363/16

Primary Examiner—Robert Pascal
Assistant Examiner—Arnold Kinkead
Attorney, Agent, or Firm—Zarley, McKee, Thomte, Voorhees & Sease

[57] ABSTRACT

A suppressor for an electronic ballast in a discharge lamp, which is connected between a ballast (A2) and a mains supply, including a supply-voltage rectifier (D2-D5) and a charging capacitor (C6). The suppressor includes at least one energy-storing inductance (L1) and at least two electronic switch elements (Q1, Q2) connected such that, when said switch elements are conducting simultaneously, a current path extends from the positive terminal of the rectifier through said switches and inductance to its negative terminal as well as two diodes (D6, D7) connected such that, when the switches (Q1, Q2) are non-conducting, a current path extends from the negative terminal of the rectifier through said diodes and inductance to its positive terminal.

15 Claims, 1 Drawing Sheet

5,698,950

SUPPRESSOR FOR AN ELECTRONIC BALLAST IN A DISCHARGE LAMP

BACKGROUND OF THE INVENTION a. Field of the Invention

The present invention relates to a circuit arrangement for use in an electronic ballast included in discharge lamps for suppressing harmonics included in a current picked up by an appliance from the mains and other electromagnetic interferences generated by the appliance. Such a suppressor is connected between a ballast and a mains supply, including a supply-voltage rectifier and a charging capacitor.

b. Problems in the Art

At present, the design of electronic ballasts used in low-pressure discharge lamps is regulated by international standards IEC 928 and IEC 929. One of the requirements in the latter is e.g. the suppression of harmonics produced in supply wires to a certain level determined in international standard IEC 555-2.

There are several prior known solutions for suppressing harmonics in a mains voltage from filter designs consisting of passive components to actively controlled filters operating at a high frequency. A fundamental circuit for such an active mains filter is shown in FIG. 1, wherein the section defined by dash lines represents a boost type of chopper-filter circuit whose load comprises an actual electronic ballast designated by symbol A2. Operation of the circuit elements is as follows: V1 is a diode bridge for rectifying a mains voltage supplied to mains terminals X1–X2. V3 is an electronic switch component, for example a MOSFET-transistor controlled by a circuit block A1. With V3 conducting, energy is charged in a coil L1. With switch V3 opening, the energy of coil L1 transfers by way of a diode V2 to a charging capacitor C1. The control of switch V3 can be effected in such a manner that the current progressing in terminals X1–X2 is for the most part sinoidal. Circuit designs based on this principle have been disclosed e.g. in application instruction AN-995 published by International Rectifier ("Electronic Ballasts Using the Cost-Saving IR2155 Driver", International Rectifier, 233 Kansas Street, El Segundo, Calif. 90245) as well as in patent publication U.S. Pat. No. 5,001,400. Commercially available are integrated circuits intended for handling the functions of block A1 in FIG. 1.

In order to generate a similar supply-current waveform there are also developed other circuit designs, called charging pumps or capacitor pumps. These have been described e.g. in the following Patent publications Nos.: FI 78807, EP 389847 and DE 3611611.

However, the above-described boost-type of filter constructions have certain drawbacks and limitations. A voltage produced by the filter circuit is always higher than the maximum value of a supply voltage, i.e. the circuit voltage is not freely selectable. In addition, the connection of an appliance provided with this type of filter circuit to the mains produces an impulse current surge in the charging capacitance of a ballast, which is not desirable from the standpoint of a supplying mains and also causes electromagnetic interferences. Furthermore, the practical application of such circuits requires the use of a separate controlling microcircuit, which adds to the circuit designing costs.

SUMMARY OF THE INVENTION

An object of the invention is to eliminate the above drawbacks and to achieve at least an equal filtering effect by means of a substantially simpler circuit design. The invention is based on integrating a flyback-type of power supply circuit with the own oscillating circuit of an electronic ballast.

Figure 1:
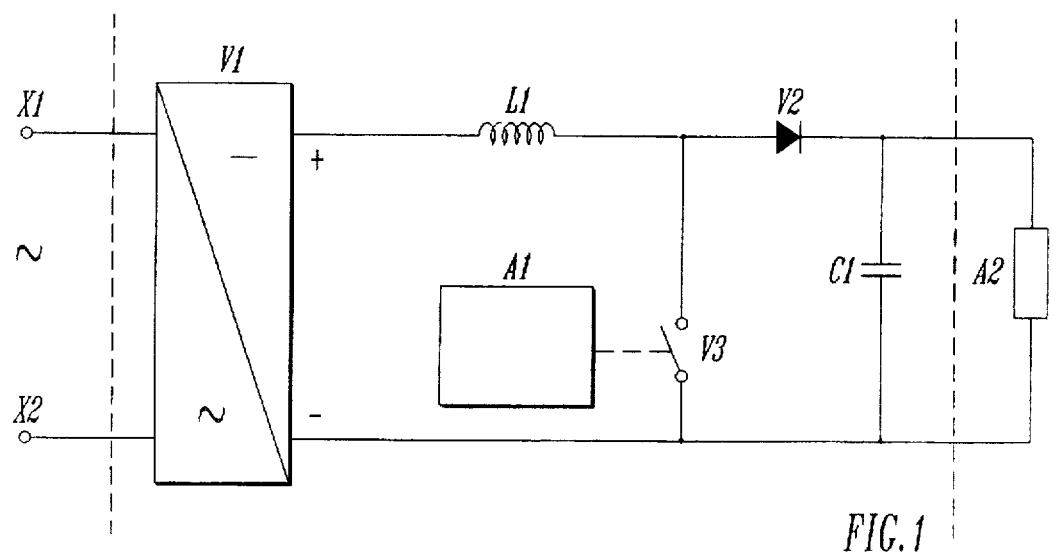
FIG. 1 is an electrical schematic depicting a filtering or suppressing circuit according to the prior art.

A benefit offered by a circuit of the invention is the arbitrary control of a voltage level produced by a filter element. The filter has an output voltage which is determined by the supply voltage, the pulse ratio, frequency and load current of the control. Aside from the supply voltage, all the above variables or quantities are controllable and a suitable control can be used for providing the ballast operating voltage with a desired value regardless of an input voltage which can be either higher or lower than the supply voltage. However, the voltage-resistance requirement set on a switch component used in the circuit does not exceed the maximum supply-voltage value, which is an essential practical advantage as the price of said component depends to a significant degree on the resistance to voltage. The basic circuit does not conduct current at all unless the ballast is in operation. The charging capacitor of a ballast can be brought to a slow charging during the appliance starting procedure and the starting current can be restricted to a desired level by means of just a single resistance. Thus, the adverse supply-current surge and the interference actions associated therewith can be limited. If the appliance is subjected to an external overvoltage stress, for example an interference occurring in the mains or an overvoltage caused by a faulty connection of the appliance, the voltage stress on a charging capacitor included in a circuit of the invention and on ballast electronics downstream thereof can be made lesser than in the prior known circuit solutions. This can be seen from FIG. 1 depicting prior known filtering or suppressing technology, wherein the mains overvoltage induces a voltage rise in the charging capacitor C1 and in the ballast A2, which in an adverse case may lead to the destruction of the entire appliance. In a solution of the invention, on the other hand, semiconductor switches can be controlled such that the passage of an overvoltage into the actual ballast electronics can be completely prevented. The simplicity of the circuit compared to other solutions is due to the fact that the control of electronic switch components (Q1 and Q2) does not require a separate control circuit but the block A1 in charge of control may well be an oscillator circuit normally included in an electronic ballast.

DESCRIPTION OF THE PREFERRED EMBODIMENT

Figure 2:
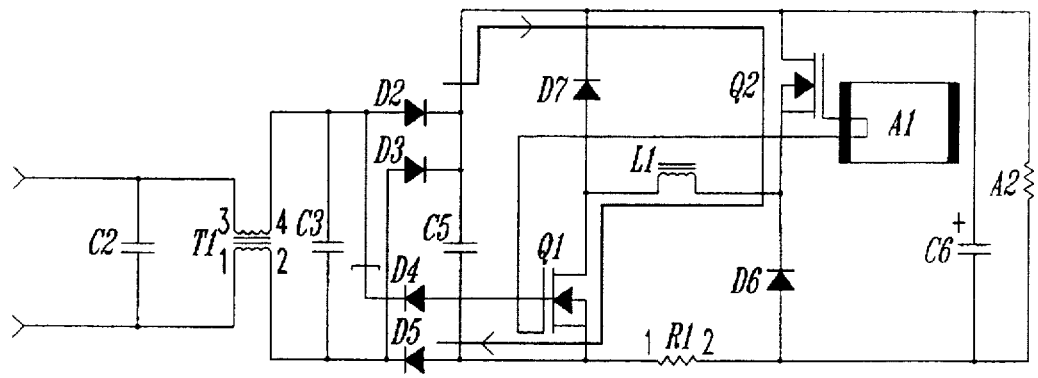
FIG. 2 is an electrical diagram depicting the passage of current in a first operating stage of a circuit according to the present invention.
Figure 3:
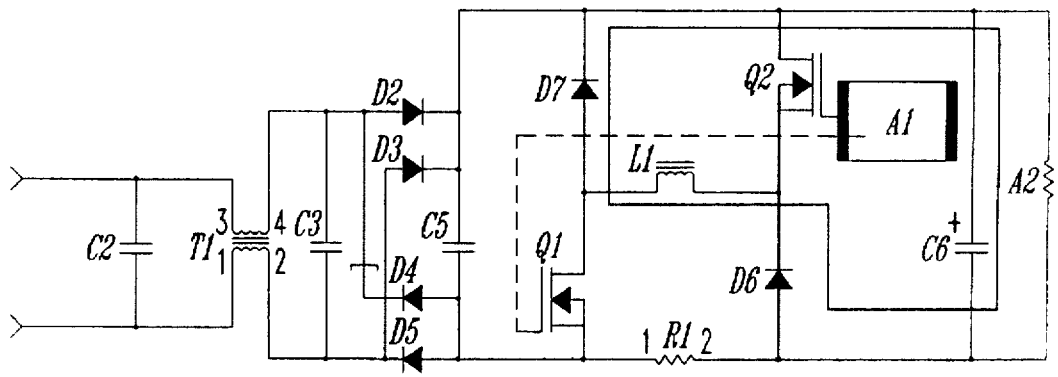
FIG. 3 is an electrical schematic diagram depicting the passage of current in a second operating stage of a circuit according to the present invention.

The invention will now be described in more detail by means of an exemplary embodiment with reference made to FIG. 2 and FIG. 3, which illustrate one circuit embodiment of the invention and its operation. The drawings show the actual ballast in a simplified fashion by replacing these components with a block A2 since, as far as the suppressor or filter is concerned, the ballast is a substantially constant load. A control block A1 for power switches can be a separate control circuit or preferably an oscillator included in the ballast component A2 in any case. Capacitors C2 and C3 as well as a coil T1 serve as a radio noise suppressor, i.e. suppress high-frequency electromagnetic interferences. Diodes D2 . . . D5 serve as a full-wave rectifier. C5 also filters or suppresses radio disturbances but, because of a high interference frequency, the capacitance can be quite low. The circuit has a two-stage operation. In a first stage Q1 and Q2 are conducting, the current produced by a supply voltage increasing in the coil L1 in proportion to the strength of the supply voltage. The passage of current in the first operating stage is depicted in FIG. 2, wherein the darkened solid line represents the current path. As the transistors are opened in stage 2 simultaneously, the energy tied up in the coil L1 forces the current to continue in the coil. Now, it has no other path but to flow through diodes D6 and D7 to a charging capacitor C6 to charge it and this condition is depicted in FIG. 3 with the darkened line. The amount of energy tied up in the coil during a single cycle is dependent on the strength of an input voltage and on the simultaneous switched-on period of Q1 and Q2. This energy transmits almost in its entirety to the charging capacitor. Since the coil energy is quadratically dependent on its current and the total energy equals the energy of a single cycle multiplied by the frequency, the following formula can be presented for a transmitted power P:

$$P = f_{ballast} \cdot (U_{in} \, rms \cdot t_{fr})^2 / 2L$$

wherein $U_{in}$=input voltage, $t_{fr}$=duration of ballast oscillator +cycle and $f_{ballast}$=operating frequency of ballast.

If the consumption of energy in a ballast is a constant, the charging capacitor voltage remains constant. The adjustment of time $t_{fr}$ (by delaying the switching of Q1) can be used for adjusting the transmitting power and the charging capacitor voltage can be set as desired. A resistance R1 can be used for suppressing a current surge to a desired value at the moment of connecting an appliance to the mains and thus to alleviate adverse mains effects and interferences. The resistance R1 may be of a temperature-responsive type and, thus, its effect on the circuit operation is reduced after the appliance has been switched on.

A circuit arrangement of the invention is particularly useful in electronic ballasts included in low-pressure discharge lamps with basic designs prior known e.g. from Patent No. FI 65524. However, it is obvious for a skilled person that the invention is not limited to just the above-described application but it is just as well applicable in the electronic ballasts of high-pressure lamps and in other ballasts operating on the chopper principle.

I claim:

1. A suppressor circuit for an electronic ballast in a discharge lamp, the suppressor circuit being connected between a ballast and a mains supply, and including a supply-voltage rectifier and a charging capacitor characterized in that the suppressor circuit includes at least one energy-storing inductance and at least two electronic switch elements connected such that, when said switch elements are conducting simultaneously, a first current path extends from the positive terminal of the rectifier through said switches and inductance to its negative terminal, wherein the charging capacitor is not in said first current path but the rectifier is in said first current path, as well as two diodes connected such that, when the switches are non-conducting, a second current path extends from the negative terminal of the rectifier through said diodes and inductance to its positive terminal.

2. A suppressor as set forth in claim 1 characterized in that between the mains supply and the rectifier is connected at least one capacitive or inductive circuit element.

3. A suppressor as set forth in claim 1, characterized in that between the positive and negative terminals of the rectifier is connected a capacitive circuit element.

4. A suppressor as set forth in claim 1, characterized in that each of the at least two electronic switch elements comprises a field effect transistor or a bipolar transistor fitted with an insulated grid or a bipolar transistor.

5. A suppressor as set forth in any of claims 1–4, characterized in that between the negative terminal of the rectifier and the negative terminal of the charging capacitor connected a temperature-responsive resistance.

6. A suppressor as set forth in claim 2, characterized in that between the positive and negative terminals of the rectifier is connected a capacitive circuit element.

7. A suppressor as set forth in claim 2, characterized in that each of the at least two electronic switch elements comprises a field effect transistor or a bipolar transistor fitted with an insulated grid or a bipolar transistor.

8. A suppressor as set forth in claim 3, characterized in that each of the at least two electronic switch elements comprises a field effect transistor or a bipolar transistor fitted with an insulated grid or a bipolar transistor.

9. A suppressor as set forth in claim 2, characterized in that between the negative terminal of the rectifier and the negative terminal of the charging capacitor is connected a temperature-responsive resistance.

10. A suppressor as set forth in claim 3, characterized in that between the negative terminal of the rectifier and the negative terminal of the charging capacitor is connected a temperature-responsive resistance.

11. A suppressor as set forth in claim 4, characterized in that between the negative terminal of the rectifier and the negative terminal of the charging capacitor is connected a temperature-responsive resistance.

12. A suppressor circuit for an electronic ballast in a discharge lamp, the suppressor circuit being connected between a ballast and a mains supply, and including a supply-voltage rectifier and a charging capacitor, characterized in that the suppressor circuit includes at least one energy-storing inductance and at least two electronic switch elements connected such that, when said switch elements are conducting simultaneously, a first current path extends from the positive terminal of the rectifier through said switches and inductance to its negative terminal, wherein the charging capacitor is not in said first current path but the rectifier is in said first current path, as well as two diodes connected such that, when the switches are non-conducting, a second current path extends from the rectifier and the negative terminal of the rectifier through said diodes and inductance to its positive terminal, and between the negative terminal of the rectifier and the negative terminal of the charging capacitor is connected a temperature-responsive resistance [(R1)].

13. A suppressor circuit for an electronic ballast in a discharge lamp, the suppressor circuit being connected between a ballast and a mains supply, and including a supply-voltage rectifier and a charging capacitor, characterized in that the suppressor circuit includes at least one energy-storing inductance and at least two electronic switch elements connected such that, when said switch elements are conducting simultaneously, a first current path extends from the positive terminal of the rectifier through said switches and inductance to its negative terminal, wherein the charging capacitor is not in said first current path but the rectifier is in said first current path, as well as two diodes connected such that, when the switches are non-conducting, a second current path extends from the negative terminal of the rectifier through said diodes and inductance to its positive terminal, and between the mains supply and the rectifier is connected at least one capacitive or inductive circuit element, and between the negative terminal of the rectifier and the negative terminal of the charging capacitor is connected a temperature-responsive resistance.

14. A suppressor circuit for an electronic ballast in a discharge lamp, the suppressor circuit being connected between a ballast and a mains supply, and including a supply-voltage rectifier and a charging capacitor, characterized in that the suppressor circuit includes at least one energy-storing inductance and at least two electronic switch elements connected such that, when said switch elements are conducting simultaneously, a first current path extends from the positive terminal of the rectifier through said switches and inductance to its negative terminal, wherein the charging capacitor is not in said first current path but the rectifier is in said first current path, as well as two diodes connected such that, when the switches are non-conducting, a second current path extends from the negative terminal of the rectifier through said diodes and inductance to its positive terminal, and between the positive and negative terminals of the rectifier is connected a capacitive circuit element and between the negative terminal of the rectifier and the negative terminal of the charging capacitor is connected a temperature-responsive resistance.

15. A suppressor circuit for an electronic ballast in a discharge lamp, the suppressor circuit being connected between a ballast and a mains supply, and including a supply-voltage rectifier and a charging capacitor, characterized in that the suppressor circuit includes at least one energy-storing inductance and at least two electronic switch elements connected such that, when said switch elements are conducting simultaneously, a first current path extends from the positive terminal of the rectifier through said switches and inductance to its negative terminal, wherein the charging capacitor is not in said first current path but the rectifier is in said first current path, as well as two diodes connected such that, when the switches are non-conducting, a second current path extends from the negative terminal of the rectifier through said diodes and inductance to its positive terminal, and each of the at least two electronic switch elements comprises a field effect transistor or a bi-polar transistor fitted with an insulated grid or bipolar transistor and between the negative terminal of the rectifier and the negative terminal of the charging capacitor is connected a temperature-responsive resistance.

* * * * *

UNITED STATES PATENT AND TRADEMARK OFFICE
CERTIFICATE OF CORRECTION

PATENT NO. : 5,698,950
DATED : December 16, 1997
INVENTOR(S) : Teijo Viljanen

It is certified that error appears in the above-identified patent and that said Letters Patent is hereby corrected as shown below:

In claim 12, column 4, line 53, please delete "[(R1)]".

Signed and Sealed this

Twenty-fourth Day of March, 1998

Attest:

BRUCE LEHMAN

Attesting Officer

Commissioner of Patents and Trademarks